Figure 1:
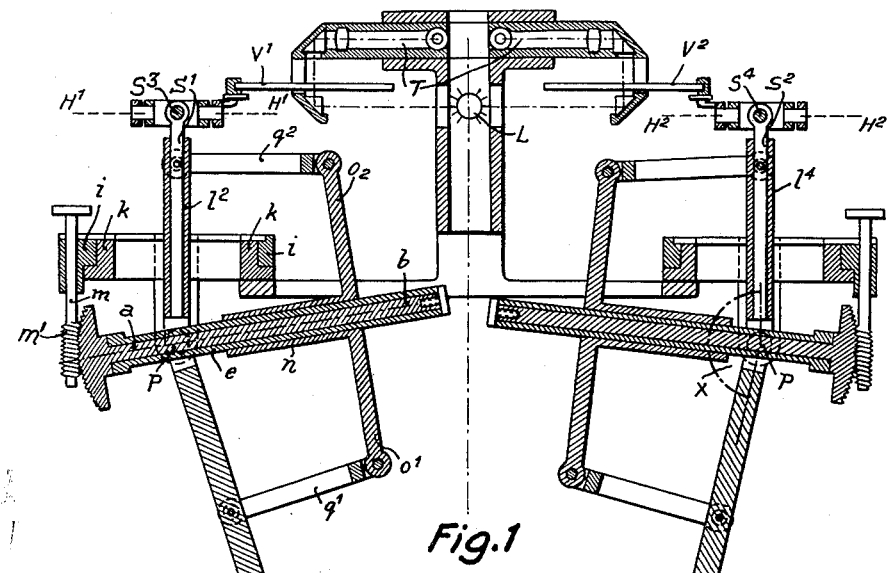

June 17, 1952  H. WILD  2,600,948
PLOTTING APPARATUS FOR PHOTOGRAMMETRIC SURVEYS
Filed Sept. 26, 1947

INVENTOR:
HEINRICH WILD
BY Ernest H Montague
AGENT

Patented June 17, 1952

2,600,948

UNITED STATES PATENT OFFICE 2,600,948

PLOTTING APPARATUS FOR PHOTOGRAMMETRIC SURVEYS

Heinrich Wild, Baden, Switzerland

Application September 26, 1947, Serial No. 776,269
In Switzerland October 9, 1946

4 Claims. (Cl. 33—20)

This invention relates to plotting apparatus for photogrammetric surveys.

Plotting apparatus for photogrammetric surveys provided with image-space and object-space rods passing through the center of projection is known in the prior art. It is also known to dispose said spatial rods in a straight line—as far as their working parts are concerned. Due to this fact, before plotting a photogrammetric survey taken at inclined optical axis the image plates of the plotting apparatus have to be positioned at a similar inclination. Therefore, said spatial rods and the plates have to be brought into the same relative position to each other as the plate of the photogrammetric survey had, while the survey was made, in relation to the optical axis. When the plotting is effected in such manner that arms of a stereoscope of variable length are coupled with the ends of the image spatial rods, while the plates remain still, it is necessary, before the plotting operation is started, when different inclinations of the survey axes are involved, to position the two portions of the stereoscope into inclinations corresponding to the inclinations of the plates. This arrangement requires, however, an instrument of very complicated construction.

It is, therefore, one object of the present invention to provide an apparatus which is simple in its construction and in its operation and is also capable of producing considerably greater precision.

It is another object of the present invention to provide a plotting apparatus for photogrammetric surveys for survey axes which extend in any desired direction with pairs of guide rods in the image space and in the object space, having for each pair of guide rods an auxiliary axle extending through the centre of projection and which is capable of being set at half the angle of convergence, and which has coupling means to couple the image space rod as well as the object space rod with said auxiliary axle, whereby for movement of the guide rods in one direction the coupling means slides upon the auxiliary axle and for movement of the guide rods in the other direction, while setting the pair of guide rods in this manner, the coupling means rotates around said auxiliary axle in such manner that the spatial angles described by the object space rod, inclined to convergence, correspond exactly to the spatial angles of the image space rod settings.

It is still another object of the present invention to provide a plotting apparatus in which the coupling means for the image and object space rods comprises a slide piece provided with two symmetrically arranged joints having links to connect the two guide rods in the image space and in the object space, whereby translation of the movement of the object space rods on the image space rods produces gliding of the slide piece upon the auxiliary axle when moved in one direction, and rotation around the auxiliary axle when moved in the other direction, upon setting the pairs of guide rods as described.

It is yet another object of the present invention to provide a plotting apparatus in which the parallel arrangement of the two image space rods at normal position in which the image space rods are parallel to each other and perpendicular to the plan of the images with reference to the optical survey axis permits movement of the two images in parallel planes by means of the ends of the image space rods, whereby the planes remain unchanged for any inclinations of the axis of the survey and the viewing stereoscope remains also unchanged.

It is a further object of the present invention to provide a plotting apparatus for the plotting of pairs of images with wind tipped survey axes; a device is disclosed which is capable of rotating each pair of guide rods and the thereto belonging auxiliary axle around an axis conforming to the normal position of the image space rods.

Figure 2:
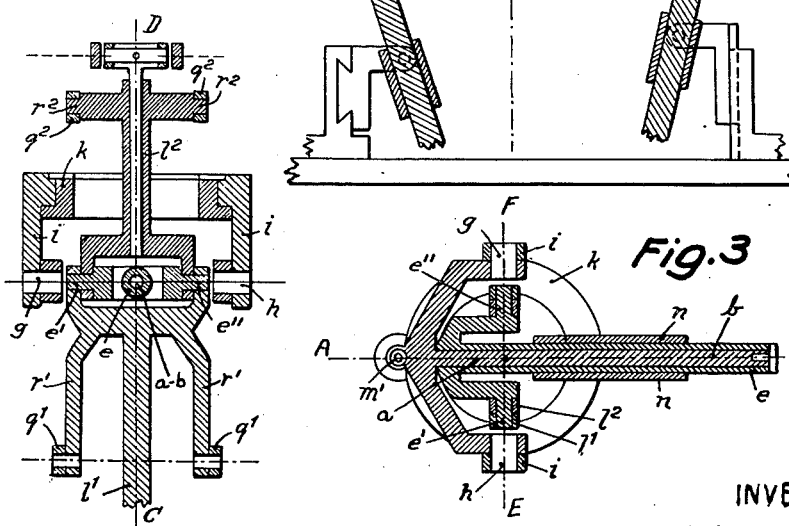
Figure 3:
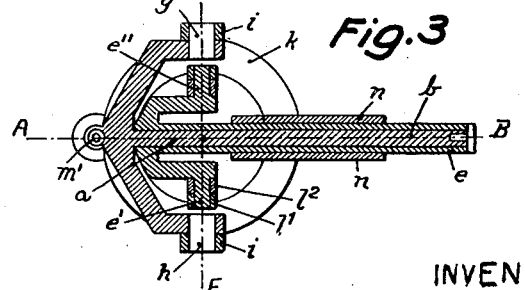

The foregoing and other objects of the invention, together with means for carrying out the invention, will be understood from the following description of an illustrative embodiment of the invention shown in the accompanying drawing in which:

Figure 1 is a section taken substantially along line C—D of Fig. 2, as well as being a section along the line A—B of Figure 3, Figure 2 is a section along the line E—F of Figure 3, and Figure 3 is a section along the line of the auxiliary axle $a$—$b$ of Figure 1 showing only the left-side half.

Referring to Figure 1, the apparatus comprises the object space rods $l^1$ and $l^3$ and the image space rods $l^2$ and $l^4$ which rods pass through the center of projection P and rotate around their common axis $e'$—$e''$. The image space rods $l^2$ and $l^4$ are shown in the so-called normal position, corresponding to the optical axis of the survey. The auxiliary axle $a$—$b$ passes through the center of the projection P and is disposed to rotate around the axis E—F on supports $g$, $h$ (Figure 2). On the auxiliary axle $a$—$b$ is rotatably disposed the axle $e$, actuating the rods $l^1$ and $l^2$. The supports $g$ and $h$ of the auxiliary axis $a$—$b$ are situated in the azimuth-piece $i$ which is rotatably supported on the circular piece K. A shaft $m$ carrying a helical worm gear $m'$ is rotatably supported in the azimuth piece $i$. The worm gear $m'$ is adapted to rotate the auxiliary axle $a$—$b$ about the axis $e'$—$e''$ and thus around the center of projection P and thereby to position the auxiliary axle $a$—$b$ at a half the angle of convergence. It is well known that the full angle of convergence is the angle formed by the space rods $l^1$, $l^2$, and $l^3$, $l^4$ respectively. By this means the object space rod $l^1$ and the image space rod $l^2$ maintain at all times equal angles in relation to the auxiliary axle $a$—$b$.

A slide $n$ provided with perpendicularly extending arms $o^1$ and $o^2$ is slidably and rotatably mounted on the cylindrical portion of the axle $e$, the latter being rotatably mounted on the auxiliary axle $a$—$b$. Forked links $q^1$ and $q^2$ which are connected to the arms $o^1$ and $o^2$ at one of their ends and to the arms $r^1$ and $r^2$, respectively, of the rods $l^1$ and $l^2$ at the other of their ends afford the coupling means between the rods $l^1$ and $l^2$. The spacings of the ends of the arms $r^1$ and $r^2$ from the center of projection P must be made exactly equal.

The image space rods $l^2$ and $l^4$ are hollow and receive adjustment rods $S^1$ and $S^2$ which are provided at their upper or outer ends with universal joints $S^3$ and $S^4$, respectively. The universal joints are disposed from the optical center P at a distance which corresponds to the focal length of the survey-objectives, when the image space rods $l^2$, $l^4$ are in their normal positions. The universal joints $S^3$ and $S^4$ move in the plane $H^1$—$H^1$ and $H^2$—$H^2$ respectively and, thereby move the slides on which the images $V^1$ and $V^2$ are supported. The stereoscope T and the illuminating arrangement L below the plates $V^1$ and $V^2$ are immovable.

When instead of the movable plates $V^1$ and $V^2$ securely fastened plates are provided, then the universal joints $S^3$ and $S^4$ of the adjustment rods $S^1$ and $S^2$ are to be connected to arms (not shown) of the telescope of variable length, which construction is already known. In relation to this latter case, the present invention affords considerable advantages resulting from simplification and higher precision.

The remaining constructional details such as used for the so called autographs may also be applied in connection with the present plotting apparatus.

I claim:

1. In a plotting apparatus for photogrammetric surveys in which a pair of stereoscopic images is viewed through a viewing stereoscope, pairs of spatial rods comprising image space rods and object space rods, each of said pairs of rods extending through the corresponding center of projection and forming an angle of convergence, an auxiliary axle passing through each of said centers of projection, means for setting said auxiliary axles at half the angle of convergence relative to the space rods of each of said pairs, and means for coupling the space rods of each of said pairs to the corresponding auxiliary axles, said coupling means being adapted to glide upon said auxiliary axles upon movement of said rods in one direction and to rotate upon said auxiliary axles upon movement of said rods in the other direction, so that the spatial angles between said object space rods and said auxiliary axle correspond exactly to the spatial angles between the latter and said image space rods.

2. The plotting apparatus, as set forth in claim 1, which includes means for positioning said image space rods parallel to the optical axis of the survey, and means for moving the images in parallel planes by said image space rods when the viewing stereoscope is firmly fixed.

3. The plotting apparatus, as set forth in claim 2, in which said positioning means for said image space rods comprises adjustment rods received by said image space rods and provided at one of their ends with respective universal joints, the latter being disposed from the center of projection of the corresponding spatial rod at a distance which corresponds to the focal length of the survey objectives.

4. The plotting apparatus, as set forth in claim 1, which includes means for rotating each pair of said spatial rods and said auxiliary axle around an axis which coincides with the axis of the corresponding image space rods when the latter are in normal position in which they are parallel to each other and perpendicularly to the planes of the images.

HEINRICH WILD.

REFERENCES CITED

The following references are of record in the file of this patent:

UNITED STATES PATENTS

| Number | Name | Date |
|---|---|---|
| 1,925,207 | Santoni | Sept. 5, 1933 |
| 2,113,970 | Wild | Apr. 12, 1938 |

FOREIGN PATENTS

| Number | Country | Date |
|---|---|---|
| 522,549 | Great Britain | June 20, 1940 |